3,663,610
AMIDINE DERIVATIVES WITH SPASMOLYTIC, PSYCHOSTIMULANT AND ANOREXIGENIC PROPERTIES
Zoltán Ecsery, Ildikó Kósa, and József Knoll, Budapest, Hungary, assignors to Chinoin Gyogyszer es Vegyeszeti Termekek Gyara RT, Budapest, Hungary
No Drawing. Filed July 8, 1968, Ser. No. 743,031
Claims priority, application Hungary, July 11, 1967, CI–718
Int. Cl. C07c 101/54
U.S. Cl. 260—518 R
2 Claims

ABSTRACT OF THE DISCLOSURE

Psychostimulant, anorexigenic and spasmolytic compounds of the general formula

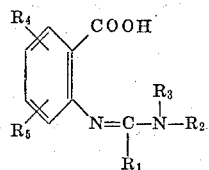

wherein $R_1$ is a member selected from the group consisting of hydrogen, alkyl, substituted alkyl, aryl, substituted aryl and heterocyclic radical, $R_2$ is a member selected from the group consisting of hydrogen, alkyl, substituted alkyl, aryl, substituted aryl and heterocyclic radical, $R_3$ is a member selected from the group consisting of hydrogen, alkyl, substituted alkyl, aryl, substituted aryl and heterocyclic radical, $R_4$ is a member selected from the group consisting of hydrogen, halogen, nitro, amino, acylamino, hydroxy and alkoxy, $R_5$ is a member selected from the group consisting of hydrogen, halogen, nitro, amino, acylamino, hydroxy and alkoxy.

---

This invention is directed to new organic compounds. More particularly it is concerned with new therapeutically active amidine derivatives, a process for the preparation thereof and pharmaceutical compositions containing same as active ingredient.

According to a feature of the present invention there are provided new amidine derivatives of the general formula

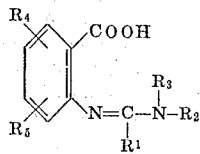

I wherein $R_1$ stands for hydrogen, alkyl, substituted alkyl, aryl, substituted aryl or a heterocyclic radical;
$R_2$ stands for hydrogen, alkyl, substituted alkyl, aryl, substituted aryl or heterocyclic radical;
$R_3$ stands for hydrogen, alkyl, substituted alkyl, aryl, substituted aryl or heterocyclic radical;
$R_4$ stands for hydrogen, halogen, nitro, amino, acylamino, hydroxy or alkoxy;
$R_5$ stands for hydrogen, halogen, nitro, amino, acylamino, hydroxy or alkoxy.

The compounds of the Formula I may be used in therapy due to their psychostimulant, anorexigenic and spasmolytic effect.

The term "alkyl" relates to straight or branched chained lower alkyl radicals containing preferably 1–5 carbon atoms, such as methyl, ethyl, propyl etc. Said alkyl radicals may be optionally substituted; suitable substituents are the following groups: halogen (e.g. chlorine or bromine), aryl groups (phenyl or substituted phenyl), heterocyclic radicals (e.g. pyridyl, morpholinyl, piperidyl, pyrazinyl, quinolyl), hydroxy, carboxy, amino, alkylamino, dialkylamino, acyl-amino, acetoxy, alkoxy, etc.

The term "aryl" relates preferably to the phenyl and naphthyl radicals. Said aryl radical may be optionally substituted by one or more groups. Suitable substituents are the following radicals: halogen, alkyl, substituted alkyl (e.g. amino-alkyl, alkylamino-alkyl, etc.), hydroxy, carboxy, acylamino, alkoxy, acyloxy etc.

The "heterocyclic radicals" may comprise one or two rings. The heterocyclic radicals containing one ring may comprise one or more nitrogen, oxygen and/or sulphur atoms (e.g. pyridyl, pyrrolyl, pyrimidyl, pirazinyl, piperidyl, pyridazinyl, etc.). As suitable representatives of the heterocyclic groups containing two rings there may be mentioned the following groups: quinolyl, indolyl, quinazolyl, quinoxalyl etc. The heterocyclic radicals may be partially or completely saturated and may bear one or more substituents.

The term "alkoxy radical" relates to straight or branched chained alkoxy radicals containing preferably not more than 8 carbon atoms, such as methoxy, ethoxy, isopropoxy etc.

The "acyl" moiety of the acylamino group may be derived from aliphatic carboxylic acids (e.g. such acids containing not more than 6 carbon atoms, such as acetic acid, propionic acid etc.), aromatic carboxylic acids (such as benzoic acid), aliphatic sulphonic acids (such as methanesulphonic acid) and aromatic sulphonic acids (e.g. benzene sulphonic acid or p-toluene sulphonic acid).

Suitable representatives of the compounds of the Formula I are the following derivatives:

$N_1$-phenyl-$N_2$-o-carboxy-phenyl-acetamidine
$N_1$-phenyl-$N_2$-o-carboxy-phenyl-formamidine
$N_1$-(4-chloro-2-methyl-phenyl)-$N_2$-o-carboxy-phenyl-acetamidine
$N_1$-(4-bromo-2-methyl-phenyl)-$N_2$-o-carboxy-phenyl-acetamidine
$N_1$-isobutyl-$N_2$-o-carboxy-phenyl-acetamidine
$N_1$-propyl-$N_2$-o-carboxy-phenyl-acetamidine
$N_1$-phenyl-$N_2$-(2-carboxy-5-nitro-phenyl)-acetamidine
$N_1$-isobutyl-$N_2$-(2-carboxy-5-nitrophenyl)-acetamidine
$N_1$-(p-2-methyl-amino-propyl-phenyl)-$N_2$-o-carboxy-phenylacetamidine
$N_1$-(p-2-ethylamino-propyl-phenyl)-$N_2$-o-carboxy-phenylacetamidine
$N_1$-phenyl-isopropyl-$N_1$-methyl-$N_2$-o-carboxy-phenyl-acetamidine
$N_1$-(p-2-methylamino-propyl-phenyl)-$N_2$-o-carboxy-phenylformamidine
$N_1$-p-methoxy-phenyl-isopropyl-$N_1$-methyl-$N_2$-o-carboxyphenyl-acetamidine.

According to a further feature of the present invention there is provided a process for the preparation of compounds of the Formula I which comprises reacting a compound of the general formula

II wherein $R_4$ and $R_5$ have the same meaning as stated above, X stands for OH, SH, or O or S which may be optionally attached to Y by forming a benzoxazinone or benzthiazinone ring, Y stands for hydrogen or a radical of the formula

in which $R_1$ has the same meaning as stated above; Z is hydrogen or a valency bond attached to Y, with a compound of the general formula

wherein A stands for hydrogen or a radical of the formula

in which B represents a reactive radical, such as halogen, alkoxy, acyloxy, or aryloxy; $R_2$ has the same meaning as stated above or if A has a meaning different from hydrogen, $R_2$ stands for valency bond attached to A $R_3$ has the same meaning as stated above.

According to a preferred form of realization of our process 3,1,4-benzoxazone of the Formula II, particularly 2-methyl-3,1,4-benzoxazone are reacted with amines of the Formula III. The reaction may be carired out preferably in the presence of a solvent, but one may also proceed by accomplishing the interaction without a solvent. Suitable solvents are e.g. the aliphatic or aromatic hydrocarbons, such as benzene, toluene, hexane or petrol, alcohols, esters and ketones. The reaction may be carried out at room-temperature or below ambient temperature. If components having a smaller activity are used, the reaction may be promoted by the application of heat. The compounds of the Formula I thus obtained often crystallize from the reaction mixture and may be removed by filtration. In other cases the reaction-product may be isolated by evaporating the solvent, One may also proceed by extracting the product from the reaction-mixture with an alkali and isolating the product by adjusting the pH of the alkaline solution to an appropriate value. If the compound contains an amino group it may be extracted from the reaction-mixture with an acid. The products thus obtained are generally of suitable purity, but if desired they may be purified by means of crystallization or other convenient methods.

According to a further form of realization of our process the anthranilic acid derivatives of the general Formula II are reacted with acid-imide-chlorides or imidoesters of the general Formula III.

The reaction may be carried out in a solvent inert under the reaction conditions used, but one may also proceed by accomplishing the interaction without solvent. Suitable solvents are among others the aliphatic and aromatic hydrocarbons, halogenated hydrocarbon derivatives, alcohols, ethers, esters etc. One may also proceed by reacting the aqueous alkaline solution of the anthranilic acid derivative with the acid-imide-chloride or imido-ester. The reaction product may be isolated by filtration, evaporation of the reaction-mixture or alkaline or acidic extraction. The structure of the compounds prepared according to the process of the present invention may be substantiated in addition to their method of preparation by their infrared spectrum. In the range of 1575 cm.$^{-1}$ a carbonyl-band being characteristic of carboxylate-ions appears in the infrared spectrum of the product, while at a wave number of 2600–2700 cm.$^{-1}$ a band being characteristic of ammonium-ions has been found, which indicates that the compounds are present in the "zwitter ion" form of the formula

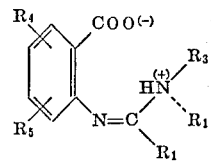

IV

The structure of the compounds prepared according to the process of the present invention is also substantiated by the fact that the products are soluble in diluted aqueous alkali. This proves the presence of the carboxyl group.

The compounds of the Formula I possess valuable therapeutical properties. Thus the $N_1$-o-carboxyl-phenyl-$N_2$-aryl-amidine derivatives exhibit significant spasmolytic effect. It is also known that the strongest spasmolytics, such as phenyl-ethyl-barbituric acid and diphenylhydantoine possess beside their spasmolytic effect a considerable hypnotic effect. The hypnotic effect of the amidine derivatives of the present invention is much smaller than that of the above known compounds, while their spasmolytic effect is of the same order of magnitude. Consequently the compounds of the Formula I may be used more advantageously in the treatment of epilepsy than the known compounds.

Another group of the compounds of the Formula I in which $R_3$ represents a 2-amino-propyl-phenyl- or phenyl-isopropyl radical, possess significant psychostimulant or anorexigenic properties. The advantage of said compounds over known anorexigenic agents resides in the fact that they do not exhibit acute stimulating effect and they increase the motility of the test-animals in a very small extent, while the hitherto known anorexigenic agents exercise significant motility-increasing effect.

According to a further feature of the present invention there are provided pharmaceutical compositions comprising as active ingredient at least one compound of the Formula I, wherein $R_1$, $R_2$, $R_3$, $R_4$ and $R_5$ have the same meaning as stated in claim 1, in admixture with suitable pharmaceutical carriers and/or excipients.

Said pharmaceutical compositions may be solid (e.g. tablets, pills, coated pills, suppositories, capsules) or liquid (such as solutions, suspensions, emulsions or injectable preparations). The preparations may be suitable for oral, rectal or paranteral administration. The carriers may be conventional organic or inorganic substances such as starch, magnesium stearate, talk, stearine, water, polyalkylene-glycols, magnesium-carbonate etc. The pharmaceutical compositions may contain additives, such as emulsifying, stabilizing, desintegrating and wetting agents etc. The preparation may comprise in addition to the compound of the Formula I further therapeutically active compounds.

The pharmaceutical compositions of the present invention may be prepared by usual methods of pharmaceutical industry known per se, by admixing the active ingredient with suitable solid or liquid organic or inorganic pharmaceutical carriers and/or excipients.

Further details of our process are to be found in the examples. It is however by no means intended to limit the scope of the invention to the examples.

EXAMPLE 1

4.83 g. of 2-methyl-3,1-benzoxazine-4-one are dissolved in 10 ml. of anhydrous ethanol, whereupon 2.8 g. of aniline are added. The mixture warms up to 55–60° C. and the precipitation of crystals begins in some minutes. An hour later the crystals are filtered, washed with ethanol and dried in vacuo until constant weight. Thus $N_1$-phenyl-$N_2$-o-carboxy-phenyl-acetamidine is obtained. M.P. 122–123° C.

Analysis.—C%, 7.10 (calcd. on the formula $$C_{15}H_{14}N_2O_2:70.9)$$

H%, 5.2 (calcd.: 5.15); N%, 11.1 (calcd.: 11.05).

The pharmacological effect of the product may be substantiated by the following data:

Inhibition of Tetracor-spasm in mice p.o. $ED_{50}$=65 mg./kg.
Antagonism of Tetracor toxicity in mice p.o. $ED_{50}$=170 mg./kg.
Inhibition of electro-shock in mice p.o. $ED_{50}$=92 mg./kg.
Inhibition of electro-shock in rats p.o. $ED_{50}$=136 mg./kg.
Inhibition of spasm caused by strichnine in mice p.o. $ED_{50}$=200 mg./kg.
Inhibition of nicotine toxicity in mice p.o. $ED_{50}$=94 mg./kg.
Hypnosis in mice p.o. $ED_{50}$=244 mg./kg.
Hypnosis in rats p.o. $ED_{50}$=250 mg./kg.
Toxicity in mice $DL_{50}$=920 mg./kg.

EXAMPLE 2

The $N_1$-phenyl-$N_2$-o-carboxyphenyl-formamidine is prepared according to the method described in Example 1. M.P. 133–135° C.

Analysis.—C%, 69.8 (calcd. for the formula $$C_{14}H_{12}N_2O_2:70.0)$$

H%, 5.1 (calcd. 5.0); N%, 11.8 (calcd. 11.6).

EXAMPLE 3

8 g. of 2-methyl-3,1-benzoxazine-4-one are dissolved in 30 ml. of anhydrous benzene and 7.06 g. of 2-methyl-4-chloro-aniline are added to the solution. The mixture warms up to 40–45° C. After 15 minutes the precipitated crystals are filtered, washed with benzene and dried in vacuo. $N_1$ - (4-chloro-2-methyl-phenyl) - $N_2$ - o - carboxy-phenylacetamidine is obtained as white crystalline substance. M.P. 122–124° C.

Analysis.—C%, 63.7 (calcd. for the formula $$C_{16}H_{15}ClN_2O_2:63.4)$$

H, 5.1 (calcd. 4.95); Cl%, 12.0 (calcd. 11.73); N%, 9.19 (calcd. 9.26).

EXAMPLE 4

The $N_1$ - (4-bromo-2-methyl-phenyl) - $N_2$-o-carboxy-phenylacetamidine is prepared according to the method described in Example 3. M.P. 116–118° C. The product is soluble in a 5% aqueous alkali solution.

Analysis.—C%, 55 (calcd. for the formula $$C_{16}H_{15}BrN_2O_2:55.8)$$

H%, 4.4 (calcd. 4.32); Br%, 23.1 (calcd. 23.0); N%, 8.2 (calcd. 8.02).

EXAMPLE 5

16.1 g. of 2-methyl-3,1-benzoxazine-4-one are dissolved in 60 ml. of benzene, whereupon 9.84 ml. of isobutyl-amine are added. The reaction-mixture warms up and the precipitation of crystals begins soon. After half an hour the crystals are filtered, washed with benzene and dried. The product is dissolved in ehtanol, whereupon ethylacetate is added and the solutions is filtered to yield a clear filtrate. After cooling to −5° C. crystals precipitate, which are filtered, washed with a 1:3 mixture of ethanol and ethyl-acetate and dried in vacuo. The white crystals thus obtained melt at 158–160° C. and are soluble in 5% alkali solution. The analysis data of the $N_1$-isobutyl-$N_2$-o-carboxy-phenyl-acetamidine thus obtained are the following:

C%, 67.2 (calcd.: for the formula $C_{13}H_{12}N_2O_2$: 66.9); H%, 7.9 (calcd.: 7.7); N%, 11.6 (calcd.: 11.95).

EXAMPLE 6

1.61 g. of 2-mehyl-3,1-benzoxazine-4-one are reacted with 0.83 ml. of n-propylamine in 3 ml. of benzene. The product is isolated as described in Example 5, whereupon it is dissolved in ethanol and precipitated by addition of ether. The $N_1$-propyl-$N_2$-o-carboxy-phenyl-acetamidine melts at 152–154° C. and is soluble in 5% aqueous alkali-solution.

Analysis.—C%, 65.5 (calcd.: for the formula $$C_{12}H_{16}N_2O_2$$

65.5); H% 7.5 (calcd.: 7.28); N%, 12.6 (calcd.: 12.7).

EXAMPLE 7

2.06 g. of 2-methyl-7-nitro-3,1-benzoxazine-4-one are dissolved in 20 ml. warm benzene. The solution is quickly cooled, whereupon 1 ml. of aniline is added. The precipitated product is first resin-like but on standing but on standing it becomes crystalline. The product is filtered, washed thoroughly with benzene and alcohol and dried. The $N_1$-phenyl-$N_2$-2 - carboxy-5-nitro-phenyl-acetamidine melts at 194–196° C. and is soluble in a 5% aqueous alkali-solution.

Analysis.—C%, 59.6 (calcd.: 60.1); H%, 4.9 (calcd.: 4.38); N%, 13.7 (calcd.: for the formula $C_{15}H_{13}N_3O_4$: 14.0).

EXAMPLE 8

2.06 g. of 2 methyl-7-nitro-3,1-benzoxazine-4-one are reacted with 0.73 g. (1 ml.) of isobutylamine as described in Example 7. The crude product is recrystallized from ethanol. Thus $N_1$-isobutyl-$N_2$-(2-carboxy-5-nitrophenyl)-acetamidine is obtained in the form of yellow crystals. The product is soluble in 5% alkali-solution and melts at 160–161° C. (yellow crystals).

Analysis.—C%, 55.7 (calcd.: for the formula $$C_{13}H_{17}N_3O_4$$

56.1) H%, 6.3 (calcd.: 6.1); N%, 15.2 (calcd.: 15.1).

EXAMPLE 9

9.55 g. of 2-methyl-3,1-benzoxazine-4-one are dissolved in 35 ml. of benzene, whereupon 9.55 g. of p-amino-phenyl-isopropyl-methyl-amine are added. The reaction mixture is allowed to stand, whereby a resin precipitates. The benzene solution is removed by decantation, the resin is washed with benzene and mixed with 40 ml. of ethanol. The precipitated crystalline product is filtered, washed with ethanol and dried. M.P.: 169–172° C. On recrystallizing the $N_1$-(p-2-methyl-amino-propyl-phenyl) - $N_2$-o-car-boxy-phenyl-acetamidine thus obtained from 50% ethanol, the melting point does not increase. The product is soluble in a 5% aqueous alkali-solution.

Analysis.—C%, 69.9 (calcd.: for the formula $$C_{19}H_{12}N_3O_2$$

70.3); H%, 7.24 (calcd.: 7.08); N%, 12.7 (calcd.: 12.9).

The pharmacological properties of the product are substantiated by the following tests: The psychostimulant effect of the product is determined in rats by antagonizing the effect of a 15 mg./kg. dose of tetrabenazine, according to the modified springing test. (Arch. Int. Pharmacodyn, 148 200; 1964). If administered in a dose of 10 mg./kg. the product antagonizes the depressive effect of tetrabenazine by 60% and in a dose of 20 mg./kg. by 100%.

The metabolism-increasing effect of the product is determined by measuring the oxygen-consumption of the rats. If administered subcutaneously in a dose of 6.9 mg./kg. the product increases metabolism by 50%. The subcutaneous toxicity amounts to 360 mg./kg. The product does not influence the motility of the animals. Amphet-amine exhibits similar effect if administered in a dose of 2 mg./kg., the toxicity of said product amounts however to $LD_{50}$=35 mg./kg. and if administered in a dose of 5 mg./kg. it increases the motility of the animals by about 50%.

If administered orally our product increases the metabolism level permanently for 2.5 hours, while on the other hand the effect of amphetamine begins to diminish already an hour after administration. Thus the spectrum of effect of our compound is broader than that of amphetamine (the toxicity thereof is one-tenth of that of amphetamine) and it exhibits a more prolonged action. Moreover our compound does not influence that motility of the animals, therefore it does not possess the undesired primary stimulating effect of amphetamine.

EXAMPLE 10

90 g. of 2-methyl-3,1-benzoxazine-4-one and 90 g. of p-amino-phenyl-isopropyl-methylamine are stirred in 900 ml. of benzene, at 50° C. for 10 hours. The reaction mixture is worked up as described in Example 8. The melting point of the crystals thus obtained amounts to 169–172° C. The properties of the $N_1$-(p-2-methylamino-propyl-phenyl)-$N_2$ - o-ocarboxy-phenyl-acetamidine obtained are identical with those of the compound prepared according to Example 8.

EXAMPLE 11

37.32 g. of phenyl-isopropyl-methylamine and 40.2 g. of 2-methyl-3,1-benzoxazine-4-one are allowed to stand at 25° C. for 20 days. The reaction-mixture is thoroughly shaken with 200 ml. of a 5% sodium-hydroxide solution, whereupon the two phases are separated. The pH of the aqueous alkaline layer is adjusted to 6.5 with acetic acid. The precipitated crystals are filtered, washed with water and dried. The product is recrystallized from water. The $N_1$-phenyl-isopropyl-$N_1$-methyl-$N_2$-o-carboxy-phenyl-acetamidine thus obtained melts at 74–75° C. and contains 5 moles of crystal-water according to the analysis. The product is soluble in 5% aqueous alkali.

Analysis.—C%, 55.7 (calcd: for the formula $C_{17}H_{22}N_3O_25H_2O$: 56.0); H%, 8.08 (calcd.: 7.78); N%, 7.4 (calcd.: 7.25).

If administered in a 100 mg./kg. s.c. dose in rats the product increases metabolism by 55%. According to the modified springing test/Arch. Int. Pharmacodyn. 148 200/1964/, a 100 mg./kg. s.c. dose of the product antagonises the depressive effect of 15 mg./kg. of tetrabenazine.

EXAMPLE 12

29.1 g. of 3,1-benzoxazine-4-one and 32 g. of p-amino-phenyl-isopropyl-methylamine are reacted as described in Example 8. The product is isolated as shown in said example. The $N_1$-p - 2-methylamino-propyl-phenyl-$N_2$-carboxy-phenyl-formamidine thus obtained melts at 152–154° C. and is soluble in 5% aqueous alkali.

Analysis.—C%, 69.0 (calcd.: for the formula $C_{18}H_{21}N_3O_2$ 69.5; H%, 6.9 (calcd.: 6.76); N%, 13.3 (calcd. 13.55).

EXAMPLE 13

$N_1$ - p-methoxy-phenyl-isopropyl-methylamine is reacted with 25.8 g. of 2-methyl-3,1-benzoxazine-4-one in 170 ml. of benzene according to the method described in Example 9. The reaction mixture is evaporated, whereupon the residue is admixed with 25 ml. of benzene. The precipitated crystals are filtered, washed with benzene and dried. The $N_1$-p-methoxy-phenyl-isopropyl-$N_1$-methyl-$N_2$ - o-carboxy-phenyl-acetamidine thus obtained is recrystallized from anhydrous ethanol. M.P.: 147–148° C. The product is soluble in 5% aqueous alkali.

Analysis.—C% 70.8 (calcd.: for the formula $C_{20}H_{24}N_2O_3$:70.5); H%, 7.00 (calcd.: 7.05); N%, 8.4 (calcd.: 8.24).

What we claim is:
1. A compound of the formula

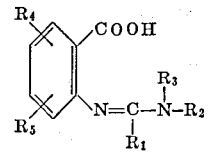

wherein $R_1$ is hydrogen or methyl and, $R_2$ and $R_3$ are each a member selected from the group which consists of hydrogen, alkyl with one to five carbon atoms, phenyl, lower - alkyl - phenyl, lower-alkyl-amino, chlorophenyl, bromophenyl, and lower-alkyl-amino-lower-alkyl-phenyl, and $R_4$ and $R_5$ are each a member selected from the group which consists of hydrogen, chlorine, bromine and nitro.

2. A compound selected from the group consisting of $N_1$-phenyl-$N_2$-o-carboxy-phenyl-acetamidine,
$N_1$-phenyl-$N_2$-o-carboxy-phenyl-formamidine,
$N_1$-(4-chloro-2-methylphenyl)-$N_2$-o-carboxy-phenyl-acetamidine,
$N_1$-(4-bromo-2-methyl-phenyl-)-$N_2$-o-carboxy-phenyl-acetamidine,
$N_1$-isobutyl-$N_2$-o-carboxy-phenyl-acetamidine,
$N_1$-propyl-$N_2$-o-carboxy-phenyl-acetamidine;
$N_1$-phenyl-$N_2$-(2-carboxy-5-nitro-phenyl-)-acetamidine,
$N_1$-isobutyl-$N_2$-(2-carboxy-5-nitro-phenyl)-acetamidine,
$N_1$-(p-2-methylamino-propyl-phenyl)-$N_2$-o-carboxy-phenyl-acetamidine,
$N_1$-(p-2-ethylamino-propyl-phenyl)-$N_2$-o-carboxy-phenylacetamidine,
$N_1$-phenyl-isopropyl-$N_1$-methyl-$N_2$-o-carboxyphenyl-acetamidine,
$N_1$-(p-2-methylamino-propyl-phenyl)-$N_2$-o-carboxy-phenyl-formamidine,
$N_1$-p-methoxy-phenyl-isopropyl-$N_1$-methyl-$N_2$-o-carboxy-phenyl-acetamidine.

References Cited
UNITED STATES PATENTS
3,150,170   9/1964   Cavallini et al. ------ 260—518

LORRAINE A. WEINBERGER, Primary Examiner

L. A. THAXTON, Assistant Examiner

U.S. Cl. X.R.

260—244 R, 247.2 R, 250 A, 256.4 R, 287 R, 294 D, 295 D, 326.14 R, 326.3, 490, 518 A, 519; 424—319